United States Patent
Cho

(10) Patent No.: US 11,392,302 B2
(45) Date of Patent: Jul. 19, 2022

(54) MEMORY SYSTEM AND OPERATING METHOD THEREOF

(71) Applicant: SK hynix Inc., Gyeonggi-do (KR)

(72) Inventor: Sung Yeob Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 279 days.

(21) Appl. No.: 16/403,856

(22) Filed: May 6, 2019

(65) Prior Publication Data
US 2020/0104062 A1    Apr. 2, 2020

(30) Foreign Application Priority Data

Sep. 28, 2018   (KR) .................. 10-2018-0116492

(51) Int. Cl.
*G06F 1/26*    (2006.01)
*G06F 1/32*    (2019.01)
*G06F 3/06*    (2006.01)

(52) U.S. Cl.
CPC .......... *G06F 3/0625* (2013.01); *G06F 3/0659* (2013.01); *G06F 3/0679* (2013.01)

(58) Field of Classification Search
CPC .... G06F 3/0659; G06F 3/0625; G06F 3/0679; G06F 3/0688; G06F 1/3225; G06F 3/0614; G06F 3/0619; G06F 3/0653
See application file for complete search history.

(56) References Cited

U.S. PATENT DOCUMENTS

| | | | | |
|---|---|---|---|---|
| 8,572,423 B1 * | 10/2013 | Isachar | ................. | G06F 3/0659 713/340 |
| 9,001,449 B1 * | 4/2015 | Bennett | ................. | G11B 19/041 360/73.03 |
| 2011/0173462 A1 * | 7/2011 | Wakrat | ...................... | G06F 1/26 713/300 |
| 2012/0221880 A1 * | 8/2012 | Kim | ..................... | G06F 1/3203 713/400 |
| 2014/0047200 A1 * | 2/2014 | Isachar | ................. | G06F 3/0604 711/154 |
| 2014/0112079 A1 | 4/2014 | Wakrat et al. | | |
| 2016/0077961 A1 * | 3/2016 | Erez | ...................... | G06F 1/3275 711/103 |
| 2018/0335977 A1 * | 11/2018 | Tidwell | ................. | G06F 3/0625 |
| 2018/0335978 A1 * | 11/2018 | Tidwell | ................. | G06F 3/0688 |
| 2019/0179392 A1 * | 6/2019 | Patel | ..................... | G06F 1/3206 |

FOREIGN PATENT DOCUMENTS

KR    10-2012-0097829    9/2012

* cited by examiner

*Primary Examiner* — Zhipeng Wang
(74) *Attorney, Agent, or Firm* — IP&T Group LLP

(57) ABSTRACT

A memory system includes a plurality of memory devices storing data, a processor generating commands at a request of a host, and a flash interface layer transferring the commands to the plurality of memory devices based on power consumptions of the plurality of memory devices, and delaying execution or transfer of commands one or more of the plurality of memory devices when a total peak power of the plurality of memory devices is expected to exceed a limit level.

20 Claims, 10 Drawing Sheets

MEMORY SYSTEM AND OPERATING METHOD THEREOF

CROSS-REFERENCE TO RELATED APPLICATION

The present application claims priority under 35 U.S.C. § 119(a) to Korean patent application number 10-2018-0116492, filed on Sep. 28, 2018, which is incorporated herein by reference in its entirety.

BACKGROUND

Field of Invention

Various embodiments generally relate a memory system and an operating method thereof, and more particularly, to a memory system capable of managing peak power of the memory system, and an operating method thereof.

Description of Related Art

A memory system may include a storage device storing data and a controller controlling the storage device in response to a request of a host.

The storage device may include a plurality of memory devices. The memory devices may operate independently of each other. Memory devices may be volatile memory devices or nonvolatile memory devices depending on whether stored data is lost when power supply is blocked.

Recently, the increase in use of portable electronic devices has led to widespread use of nonvolatile memory devices. A controller may control a memory device to perform a program operation to store data in a memory cell, a read operation to read the data stored in the memory cell, and an erase operation to erase the stored data.

The controller may control a plurality of memory devices by using limited power supplied to the memory system. However, when the plurality of memory devices operate at the same time, peak power may increase and exceed the limited power. As a result, operating errors may occur in the memory system.

SUMMARY

Various embodiments are directed to a memory system capable of controlling operations of memory devices so that peak power may not exceed a limited level, and an operating method thereof.

In accordance with an embodiment, a memory system may include a plurality of memory devices storing data, a processor generating commands at a request of a host, and a flash interface layer transferring the commands to the plurality of memory devices based on power consumptions of the plurality of memory devices, and delaying execution or transfer of commands of one or more of the plurality of memory devices when a total peak power of the plurality of memory devices is expected to exceed a limit level.

In accordance with an embodiment, a memory system may include a storage device storing data, and a controller controlling the storage device in response to a request of a host, wherein the controller monitors power consumed by the storage device, calculates a period in which a peak power of the storage device being operated exceeds a limit level, and delays a peak power operation according to a calculation result.

A method of operating a memory system may include storing, in a controller, peak power period information on operations of memory devices, monitoring power consumption amounts of the memory devices, operating the memory devices according to the power consumption amounts, delaying a peak power operation of a selected memory device, among the memory devices, before peak powers of the memory devices exceed a limit level according to the peak power period information, and performing a peak power operation on the selected memory device a specific period of time after the peak power operation of the selected memory device is delayed.

DETAILED DESCRIPTION

Advantages and features of the present invention and methods for achieving them will be made clear from embodiments described below in detail with reference to the accompanying drawings. However, elements and features of the present invention may be configured or arranged differently than in the disclosed embodiments. Thus, the present invention is not limited to the embodiments set forth herein. Rather, these embodiments are provided so that this disclosure is thorough and complete and fully conveys the scope of the embodiments to those skilled in the art. Also, throughout the specification, reference to "an embodiment," "another embodiment" or the like is not necessarily to only one embodiment, and different references to any such phrase are not necessarily to the same embodiment(s).

It will be understood that when an element is referred to as being "coupled" or "connected" to a certain element, it may be directly coupled or connected to the certain element or may be indirectly coupled or connected to the certain element, with one or more intervening elements being present therebetween. In the specification, when an element is referred to as "comprising" or "including" a component, it does not exclude other components but may further include other components unless the context indicates otherwise.

Embodiments of the invention will be described in detail with reference to the accompanying drawings.

Figure 1:
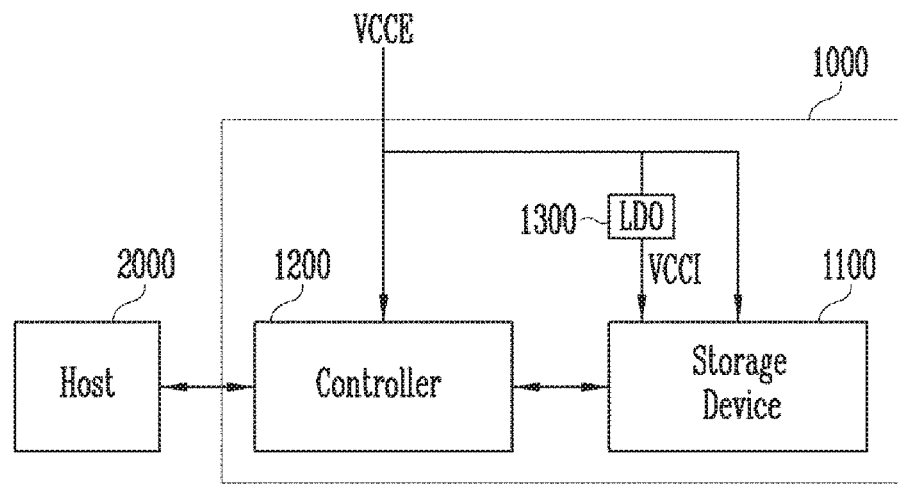
FIG. 1 is a diagram illustrating a memory system in accordance with an embodiment of the present disclosure.

FIG. 1 is a diagram illustrating a memory system 1000 in accordance with an embodiment of the present disclosure.

Referring to FIG. 1, the memory system 1000 may include a storage device 1100 storing data and a controller 1200.

The storage device 1100 may include a plurality of memory devices. Each of the memory devices may include a plurality of memory cells storing data. The controller 1200 may control the storage device 1100 to program data, output the stored data to the controller 1200, or erase the stored data.

The controller 1200 may control the storage device 1100 in response to a request of the host 200. However, even in the absence of a request from a host 2000, the controller 1200 may control the storage device 1100 through an internal operation.

Power may be externally supplied for operation of the storage device 1100 and the controller 1200. For example, an external voltage VCCE may be supplied from a source external to the memory system 1000 to each of the storage device 1100 and the controller 1200. In addition, the storage device 1100 may operate at an internal voltage VCCI which is internally used in addition to the external voltage VCCE. The memory system 1000 may further include a regulator 1300 which converts the external voltage VCCE into the internal voltage VCCI. For example, the regulator 1300 may be a low dropout (LDO) regulator. The LDO regulator may convert the external voltage VCCE into the internal voltage VCCI by reducing a voltage level of the external voltage VCCE. The storage device 1100 may perform various operations using the external voltage VCCE and the internal voltage VCCI.

The memory system 1000 may further include a regulator for supplying an internal voltage to the controller 1200, a regulator for converting a voltage, output from the controller 1200, into a voltage to be used by the storage device 1100 and outputting the converted voltage to the storage device 1100, or the like in addition to the regulator 1300 supplying the internal voltage VCCI.

Since the externally supplied external voltage VCCE is limited, in an embodiment, the controller 1200 and the storage device 1100 which prevent peak power of the storage device 1100 from being greater than a limit level may be provided. This will be described below in more detail.

Figure 2:
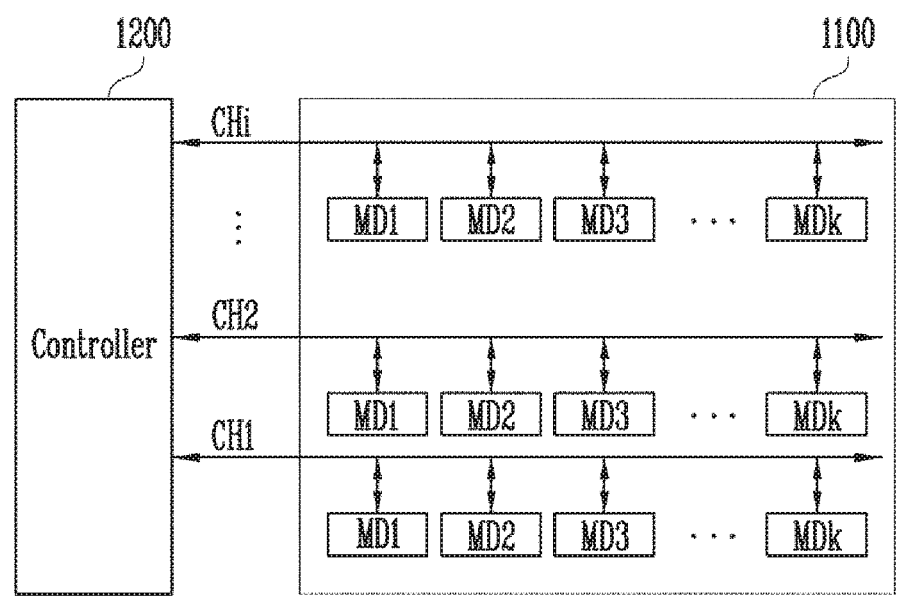
FIG. 2 is a detailed diagram of a storage device, such as that of FIG. 1.

FIG. 2 is a detailed diagram of the storage device 1100 of FIG. 1.

Referring to FIG. 2, the storage device 1100 may include a plurality of memory devices MD1 to MDk, where k is a positive integer. For example, the plurality of memory devices MD1 to MDk may communicate with the controller 1200 through a plurality of CH1 to CHi. The plurality of memory devices MD1 to MDk may be coupled to each of the channels CH1 to CHi. The controller 1200 may output a command to only a selected memory device, among the plurality of memory devices coupled to a selected channel. For example, the controller 1200 may output a first command to the first memory device MD1, among the memory devices MD1 to MDk coupled to the first channel CH1, and may subsequently output a second command to the second memory device MD2. In other words, the controller 1200 may not output commands to the first and second memory devices MD1 and MD2 at the same time. The channels CH1 to CHi may include a plurality of lines. Since the channels CH1 to CHi may have the same configuration, one of the channels CH1 to CHi will be described below as an example.

Figure 3:
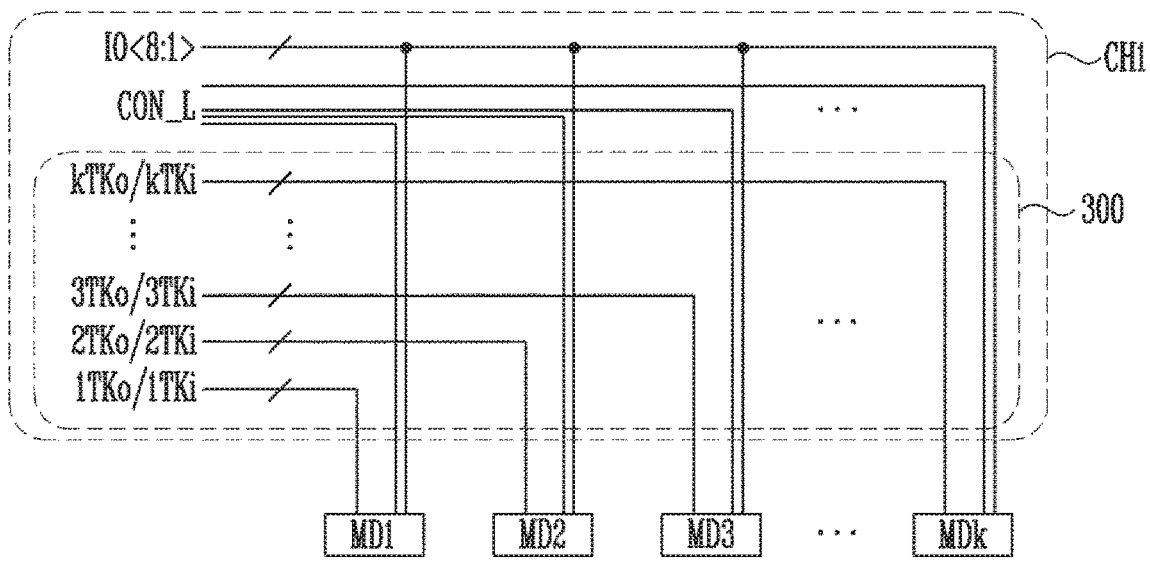
FIG. 3 is a diagram illustrating channels coupled to memory devices, such as those of FIG. 2.

FIG. 3 is a diagram illustrating the channels CH1 to CHi coupled to the memory devices MD1 to MDk as shown in FIG. 2. The first channel CH1 will be described below as an example with reference to FIG. 3.

Referring to FIG. 3, the first channel CH1 may include input/output lines IO<8:1>, control lines CON_L and token control lines 300.

The input/output lines IO<8:1> may be used to transfer commands, addresses and data DATA between the controller 1200 and the memory devices MD1 to MDk. For example, the controller 1200 may transfer the commands, the addresses and the data DATA to a selected memory device through the input/output lines IO<8:1>. The selected memory device may transfer the data DATA to the controller 1200 through the input/output lines IO<8:1>. As illustrated in FIG. 3, there may be eight input/output lines IO<8:1>. However, the number of input/output lines is not limited to eight.

The control lines CON_L may be coupled to the memory devices MD1 to MDk, respectively, and each may be used to transfer a chip enable signal for selecting a memory device.

The token control lines 300 may include a plurality of lines, each pair of which is coupled to a corresponding one of the first to kth memory devices MD1 to MDk. The token control lines 300 include lines for transferring first to kth token output signals 1TKo to kTKo for delaying some operations and lines for transferring first to kth token input signals 1TKi to kTKi. Each of the token input signals represents an end information signal of a delayed operation, and start and end period information signals of a peak power period which is not delayed. Delaying some operations may refer to delaying commands for the corresponding operations. In other words, some operations may be delayed by delaying the execution or transfer of commands to be transferred to the memory device. Corresponding first to kth token output signals 1TKo to kTKo and first to kth token input signals 1TKi to kTKi may form a pair and be coupled to a single memory device. For example, a first pair that includes the first token output signal 1TKo and the first token input signal 1TKi may be coupled to the first memory device MD1, and a kth pair that includes the kth token output signal kTKo and the kth token input signal kTKi may be coupled to the kth memory device MDk.

The controller 1200 may selectively delay a period in which peak power occurs during an operation being performed by the selected memory device through the first to kth token output signals 1TKo to kTKo. The first to kth memory devices MD1 to MDk may inform the controller 1200 through the first to kth token input signals 1TKi to kTKi that a peak power period delayed by the first to kth token output signals 1TKo to kTKo has ended.

Figure 4:
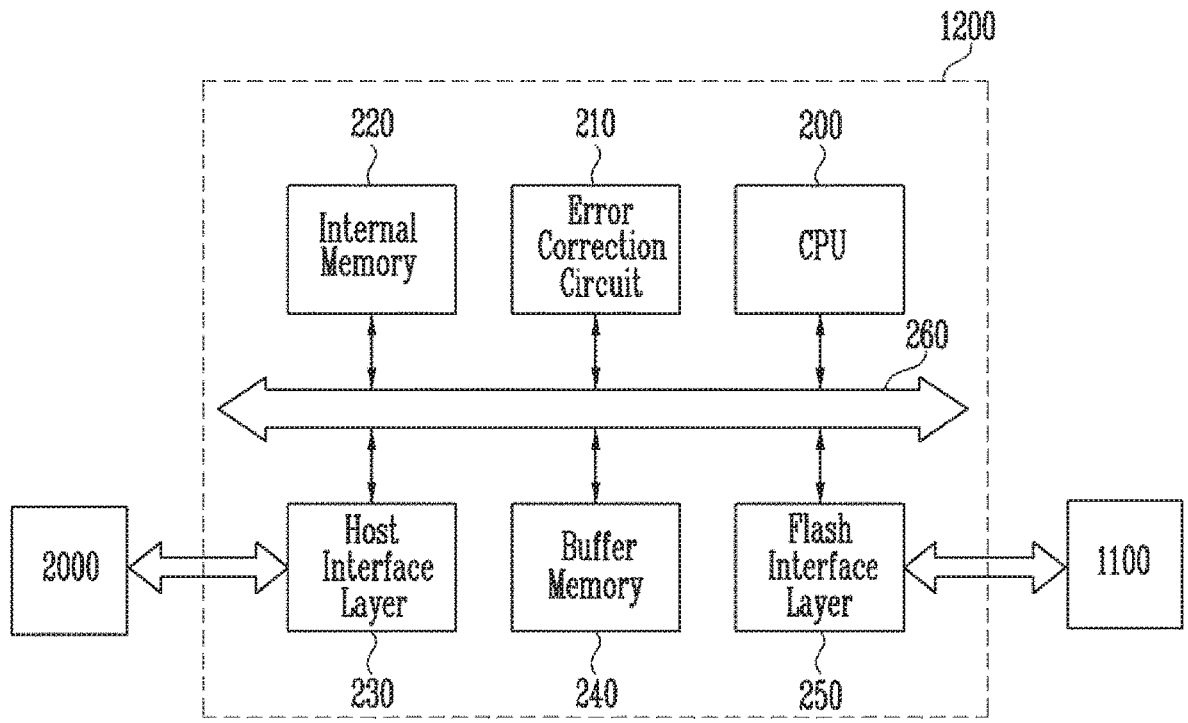
FIG. 4 is a detailed diagram of a controller, such as that of FIG. 2.

FIG. 4 is a detailed diagram of the controller 1200 of FIG. 2.

Referring to FIG. 4, the controller 1200 may control communication between the host 2000 and the storage device 1100. The controller 1200 may include a processor, e.g., a central processing unit (CPU) 200, an error correction circuit 210, an internal memory 220, a host interface layer 230, a buffer memory 240 and a flash interface layer 250. The CPU 200, the error correction circuit 210, the internal memory 220, the host interface layer 230, the buffer memory 240 and the flash interface layer 250 may communicate with each other through a bus 260.

The CPU 200 may generate commands and addresses and perform various operations for the memory system 1000 at the request of the host 2000.

The error correction circuit 210 may encode the data received from the host 200 during a program operation and decode data received from a memory device during a read operation.

The internal memory 220 may store various types of information for operations of the controller 1200. For example, the internal memory 220 may include logical and physical address map tables. Address map tables may be stored in memory devices. When the memory system 1000 is booted, the address map tables stored in the memory devices may be loaded into the internal memory 220. The internal memory 220 may include at least one of random access memory (RAM), dynamic RAM (DRAM), static RAM (SRAM), cache, and tightly coupled memory (TCM).

The host interface layer 230 may exchange commands, addresses, and data between the controller 1200 and the host 2000. For example, the host interface layer 230 may receive a request, addresses and data from the host 2000 and transfer data to the host 2000.

The buffer memory 240 may temporarily store data for operations during the operations of the memory system 1000. For example, during a program operation, the buffer memory 240 may temporarily store the original program data until the program operation of the selected memory device passes. During a read operation, the buffer memory 240 may temporarily store data read from a memory device. In addition, the buffer memory 240 may store address mapping information necessary for operations of the memory system 1000 and may frequently update the address mapping information. The buffer memory 240 may be a dynamic random-access memory (DRAM).

The flash interface layer 250 may exchange commands, addresses, and data between the controller 1200 and the storage device 1100. For example, the flash interface layer 250 may transfer commands, addresses, data and token output signals to the storage device 1100 and may receive data and token input signals from the storage device 1100 through channels.

In addition, the flash interface layer 250 may perform a queueing operation to change the order of commands generated by the CPU 200 according to a status of the storage device 1100, and may sequentially output the queued commands to the storage device 1100. For example, the flash interface layer 250 may determine an execution order of the commands in consideration of a peak power of the storage device 1100.

In addition, the flash interface layer 250 may periodically, regularly or constantly monitor peak power of each of the memory devices which are performing operations, may predict a period in which the peak power is greater than a limit level, and may delay the corresponding period for a set or predetermined time to distribute the peak power. In other words, the flash interface layer 250 may predict a peak power period with respect to each of the commands and transfer commands by selecting memory devices which delay or do not delay the execution of the commands, among the first to kth memory devices MD1 to MDk. For example, the commands may be queued according to the priority of the commands, and execution times of the commands may be controlled according to the peak power period.

In addition, the flash interface layer 250 may count the number of times a delay operation is performed on each of the first to kth memory devices MD1 to MDk and may control the delay operation, based on the count result, to prevent the delay operation from being concentrated on a specific memory device, among the first to kth memory devices MD1 to MDk.

The flash interface layer 250 will be described below in more detail.

Figure 5:
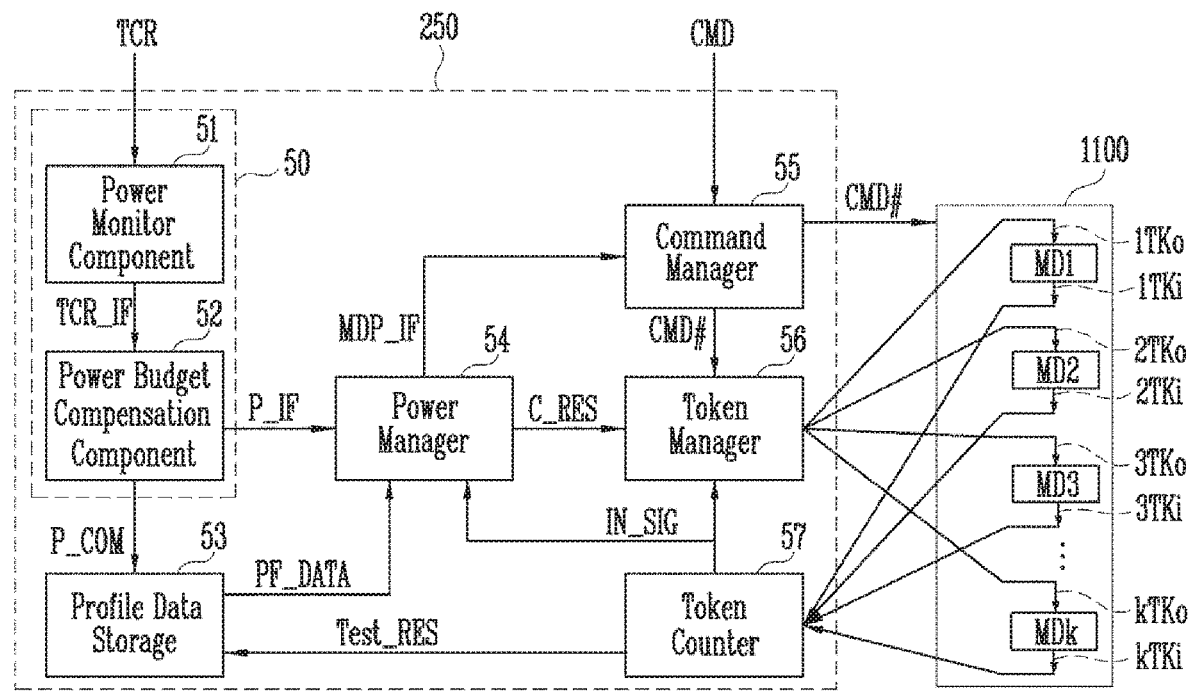
FIG. 5 is a detailed diagram of a flash interface layer, such as that of FIG. 4.

FIG. 5 is a detailed diagram of the flash interface layer 250 of FIG. 4.

Referring to FIG. 5, the flash interface layer 250 may include a power compensation circuit 50, a profile data storage 53, a power manager 54, a command manager 55, a token manager 56 and a token counter 57.

The power compensation circuit 50 may measure a current caused by power supplied to the storage device 1100 during a test operation and may adjust a power budget allocated to each of the memory devices based on the measured current. In addition, the power compensation circuit 50 may monitor the power supplied to the storage device 1100 in real time. The power compensation circuit 50 may include a power monitor component 51 and a power budget compensation component 52.

The power monitor component 51 may monitor the power supplied to the storage device 1100 and measure the total amount of current TCR flowing a power supply line to monitor the power supplied to the storage device 1100 during the test operation of the storage device 1100. For example, the power monitor component 51 may measure the total current amount TCR of lines through which the external voltage VCCE and the internal voltage VCCI are supplied to the storage device 1100. For example, the test operation of the storage device 1100 may be performed on each of the memory devices included in the storage device 1100, and the test operation may include a test program operation, a test read operation and a test erase operation. In other words, the power monitor component 51 may measure the total current amount TCR when the test program operation is performed by the selected memory device, and may measure the total current amount TCR when the test read operation is performed by the selected memory device. The power monitor component 51 may measure the total amount of current consumed by each of the memory devices during each of the test operations on each of the memory devices and may output total current amount information TCR_IF including the measured values. In addition, the power monitor component 51 may output the total current amount information TCR_IF by measuring the total amount of current consumed during an actual operation of the storage device 1100 in real time.

The power budget compensation component 52 may output, on the basis of the total current amount information TCR_IF, power information P_IF about the current power consumption amount of each memory device and a power compensation signal P_COM for adjusting power consumption profile data relating to power of each of the memory devices. The power information P_IF may be used by the power manager 54 and the power compensation signal P_COM may be used by the profile data storage 53. For example, the power compensation signal P_COM is used to change a basic profile data stored in the profile data storage 53.

The profile data storage 53 may store power-related data which is basically stored in the memory system 1000. For example, the profile data storage 53 may store basic profile data on power consumption of the storage device 1100. For example, the basic profile data may include data on power consumed by each of the memory devices in the storage device 1100 and data on power consumed by each of the operations, e.g., program, read and erase operations performed by each of the memory devices. In addition, the basic profile data may include data on a start time and an end time of a peak power period in which power consumption is the greatest in each of the operations.

Basic profile data may be stored in memory systems during their manufacture. The basic profile data may be formed through test operations of the plurality of memory systems, and differences may occur in electrical characteristics when the plurality of memory systems are manufactured. Therefore, the profile data storage 53 may adjust the basic profile data in response to the power compensation signal P_COM. In other words, the memory system 1000 may adjust the basic profile data stored in the profile data storage 53 according to electrical characteristics. The profile data storage may output adjusted power consumption profile data PF_DATA to the power manager 54.

The power manager 54 may adjust a power consumption amount of each of the memory devices in real time according to the power information P_IF and the power consumption profile data PF_DATA to output adjusted power information MDP_IF. The adjusted power information MDP_IF may be transferred to the command manager 55. In addition, the power manager 54 may calculate a period in which peak power is greater than a limit level based on the power consumption profile data PF_DATA and an input signal IN_SIG, and may output a calculation result C_RES to the token manager 56. The input signal IN_SIG may be received from the token counter 57 and indicate that the delayed peak power period is ongoing or has ended.

The command manager 55 may receive a command CMD from the CPU 200 of FIG. 4 and change an execution order of the command CMD according to the adjusted power information MDP_IF. In other words, the command manager 55 may queue the command CMD according to the power consumption amount of each of the first to kth memory devices MD1 to MDk in the storage device 1100. When the command CMD is queued, the command manager 55 may output a queued command CMD #.

The token manager 56 may receive the queued command CMD #, may check operating periods during which the peak power of the storage device 1100 is greater than the limit level in response to the calculation result C_RES output from the power manager 54 and the input signal IN_SIG output from the token counter 57, and may delay a corresponding operating period by outputting the first to kth token output signals 1TKo to kTKo before the corresponding operating period starts.

The first to kth token output signals 1TKo to kTKo may not necessarily be output at the same time; instead they may be selectively output according to the power consumption amount of each of the first to kth memory devices MD1 to MDk. For example, when a portion of an operation performed by the first memory device MD1, among the first to kth memory devices MD1 to MDk, is to be delayed, the token manager 56 may output only the first token output signal 1TKo. For example, since the first to kth token output signals 1TKo to kTKo may be transferred to the first to kth memory devices MD1 to MDk, respectively, through different lines, the selective token output signals may be output independently, which output may be simultaneously or sequentially. For example, when a portion of an operation performed by the first memory device MD1, among the first to kth memory devices MD1 to MDk, is to be delayed, the token manager 56 may output only the first token output signal 1TKo. In addition, when the token manager 56 selectively outputs the first to kth token output signals 1TKo to kTKo, the token manager 56 may control the output timing of a corresponding token output signal according to a time at which the peak power period is performed in each of the memory devices.

The token counter 57 may output a test result value Test_RES and the input signal IN_SIG in response to the first to kth token input signals 1TKi to kTKi received from the first to kth memory devices MD1 to MDk, respectively.

The test result value Test_RES may be used to accurately measure and define peak power periods of the first to kth memory devices MD1 to MDk during a test operation of the memory system 1000, and the profile data storage 53 may use the test result value Test_RES in order to adjust the basic profile data.

The input signal IN_SIG may be used to check the peak power status of each of the memory devices being currently operated and accurately define the peak power period when an actual operation is performed after the test operation. For example, the input signal IN_SIG may be transferred to each of the power manager 54 and the token manager 56. In addition, the power manager 54 may calculate a period in which a peak power is greater than a limit level based on the power consumption profile data PF_DATA and the input signal IN_SIG, and may output the calculation result C_RES to the token manager 56. The token manager 56 may check operating periods during which the peak power of the storage device 1100 is greater than the limit level in response to the calculation result C_RES output from the power manager 54 and the input signal IN_SIG output from the token counter 57.

The first to kth token input signals 1TKi to kTKi may not always be output from the first to kth memory devices MD1 to MDk, and may be output from the memory devices to which the first to kth token output signals 1TKo to kTKo are input. For example, when the first token output signal 1TKo is applied to only the first memory device MD1, the first token input signal 1TKi may be output only from the first memory device MD1 after a delay time by the first token output signal 1TKo. For example, when the first token output signal 1TKo is enabled, the first memory device MD1 may delay a peak power operation while the first token output signal 1TKo remains enabled and may output the first token input signal 1TKi when the first token output signal 1TKo is disabled. The first token output signal 1TKo may remain enabled during the peak power operation delayed by the first memory device MD1. In other words, the first token output signal 1TKo may remain enabled during a period in which a peak power occurs.

Select elements included in the above-described flash interface layer 250 will be described below in detail.

Figure 6:
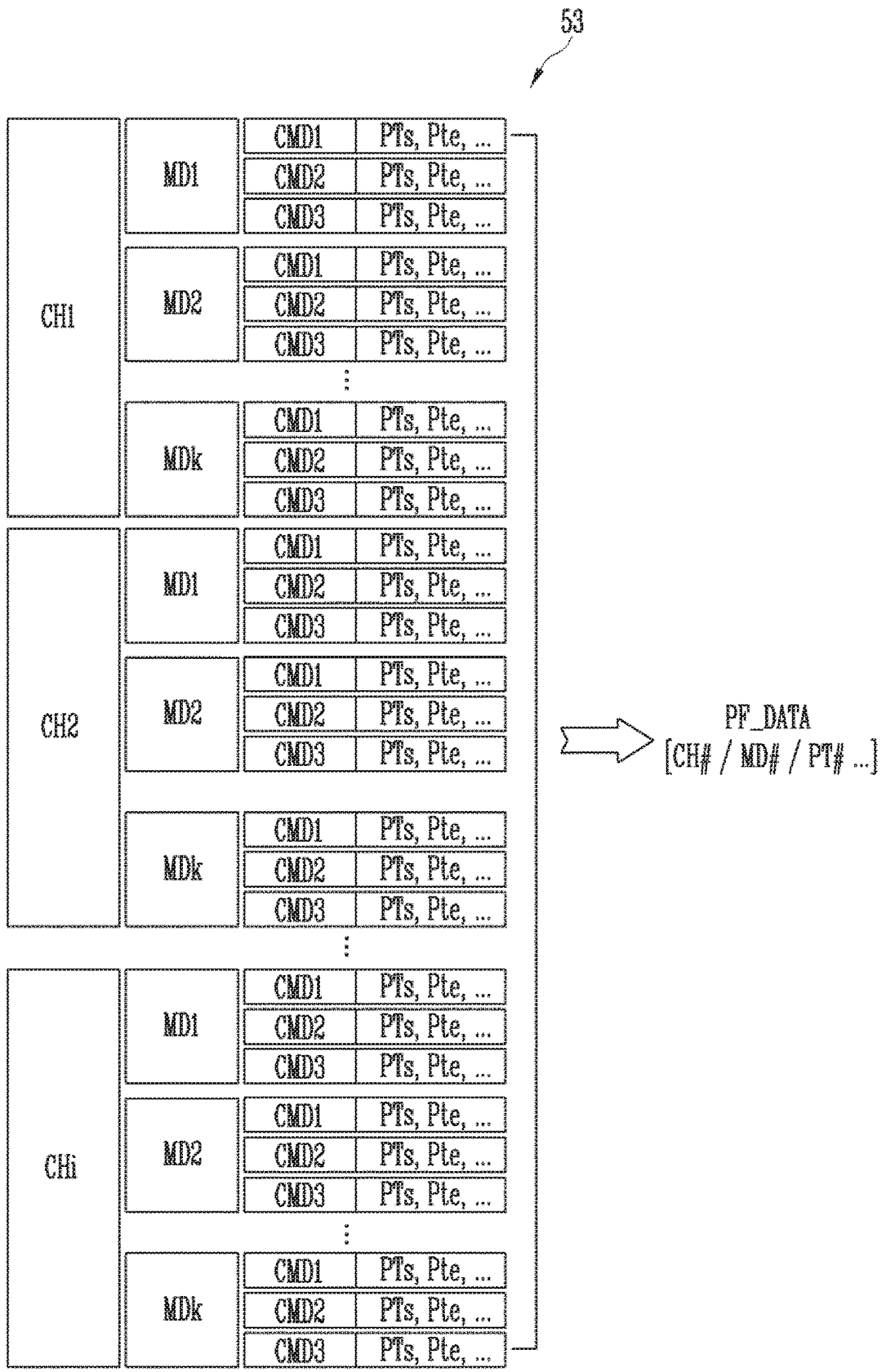
FIG. 6 is a detailed diagram of a profile data storage, such as that of FIG. 5.
Figure 7:
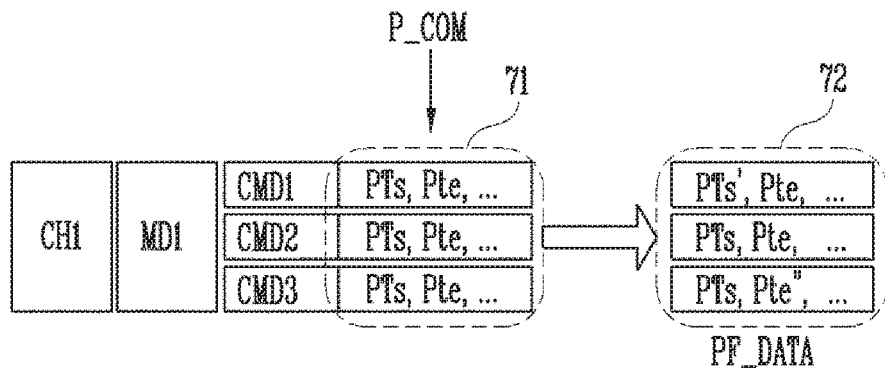
FIG. 7 is a diagram illustrating a method of correcting data stored in a profile data storage, such as that of FIG. 6.

FIG. 6 is a detailed diagram of the profile data storage 53 of FIG. 5. FIG. 7 is a diagram illustrating a method of adjusting data stored in the profile data storage of FIG. 6.

Referring to FIG. 6, the profile data storage 53 may store and adjust the power consumption profile data PF_DATA on operations performed by each of the memory devices included in the storage device 1100. In the illustrated embodiment, the controller 1200 is coupled to the first to ith channels CH1 to CHi and the first to kth memory devices MD1 to MDk are coupled to each of the channels CH1 to Chi. The present invention, however, is not limited to this configuration.

When the first to kth memory devices MD1 to MDk perform operations according to first to third commands CMD1 to CMD3, information PTs and PTe on a period in which a peak power occurs in an operation corresponding to each command may be stored in the profile data storage 53. For example, the profile data storage 53 may store the information about the start time PTs and the end time PTe of a period in which the peak power occurs when the first memory device MD1 coupled to the first channel CH1 executes the first command CMD1. As described above, the profile data storage 53 may store the information about the start time PTs and the end time PTe of the period in which the peak power occurs for execution of each of the commands CMD1 to CMD3, and may store the basic profile data before the test operation of the memory system 1000 is performed. The power consumption profile data PF_DATA may include channel information CH #, memory device information MD # and peak power period information PT #. The peak power period information PT # may include the start and end time PTs and PTe of the period in which the peak power occurs when a select memory device MD # executes a particular command (CMD1, CMD2, CMD3) related to peak power. Peak power period information PT # may be available for each specific combination of variables, e.g., MD #, CH #, CMD. For example, the power consumption profile data PF_DATA may further include a peak power value per peak power period in addition to the above-described information.

Referring to FIG. 7, as the power consumption profile data PF_DATA, which is initially stored basic profile data 71, may be output when there is no data to be adjusted when a test operation of the memory system 1000 is performed. When the power compensation signal P_COM is output from the power budget compensation component 52, the profile data storage 53 may adjust the power consumption profile data PF_DATA (e.g., the start and end times PTs and PTe of the period in which the peak power occurs when the select memory device coupled to the select channel executes the select command) selected in response to the power compensation signal P_COM and may output adjusted power consumption profile data 72.

In other words, the basic profile data 71 may be initially stored without considering electrical characteristics of respective storage devices, and the basic profile data 71 may be adjusted according to the electrical characteristics (i.e., the power compensation signal P_COM) of the storage device 1100, so as to obtain the adjusted power consumption profile data 72.

Figure 8:
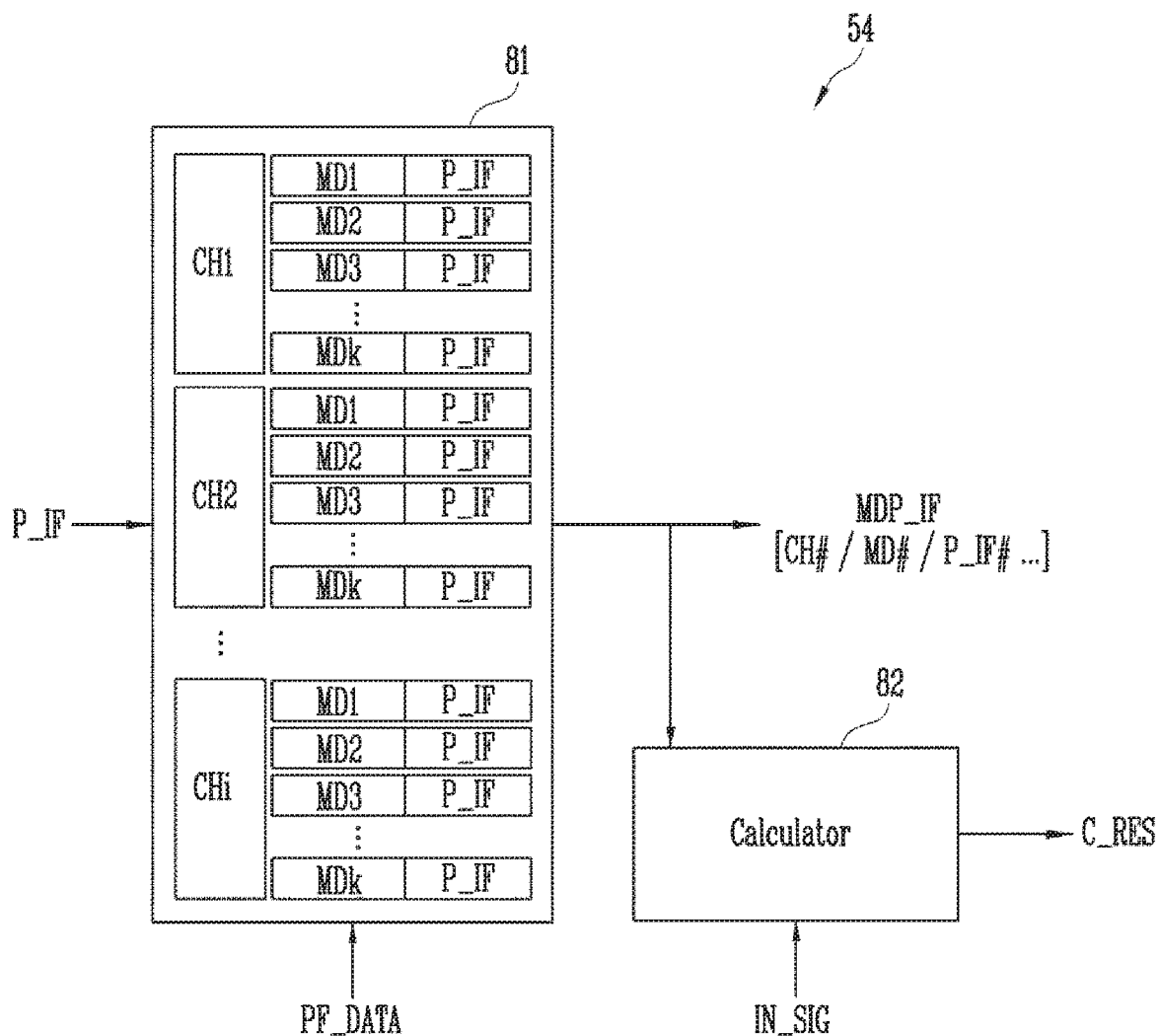
FIG. 8 is a detailed diagram of a power manager, such as that of FIG. 5.

FIG. 8 is a detailed diagram of the power manager 54 of FIG. 5.

Referring to FIG. 8, the power manager 54 may output the adjusted power information MDP_IF by adjusting the power information P_IF, which indicates the current power consumption amount of each memory device, based on the power consumption profile data PF_DATA, may calculate a period in which a peak power exceeds a limit level based on the power consumption profile data PF_DATA and the input signal IN_SIG, and may output the calculation result C_RES to the token manager 56. The power manager 54 may include a power information storage 81 and a calculator 82.

The power information storage 81 may store and update the power information P_IF indicating the current power consumption amount of each of the memory devices MD1 to MDk. For example, the power information P_IF indicating the current power consumption amount of each of the first to kth memory devices MD1 to MDk coupled to each of the first to ith channels CH1 to CHi may be stored in the power information storage 81. The power information P_IF may represent an amount of power currently necessary for each of the memory devices. The data stored in the power information storage 81 may be output as the adjusted power information MDP_IF. For example, the adjusted power information MDP_IF may include channel information CH #, memory device information MD # and necessary power information P_IF #.

The calculator 82 may receive the adjusted power information MDP_IF, may calculate a period in which a peak power is greater than a limit level based on the input signal IN_SIG, and may generate and output the calculation result C_RES to the token manager 56. For example, since the adjusted power information MDP_IF includes the power information for each of the memory devices, the calculator 82 may output, as the calculation result C_RES, a value obtained by adding the necessary power of a selected memory device to peak powers of the remaining memory devices, which are represented by the input signal IN_SIG enabled while the selected memory device consumes a peak power. For example, the calculator 82 may update information on the delayed period of the selected memory device on the basis of the input signal IN_SIG and may identify an operation and a period of each memory device causing total power consumption greater than the limit level on the basis of the updated information. The calculated information may be output as the calculation result C_RES. In other words, the calculation result C_RES may include information on an operation and a period of each memory device causing total power consumption greater than the limit level occurs.

Figure 9:
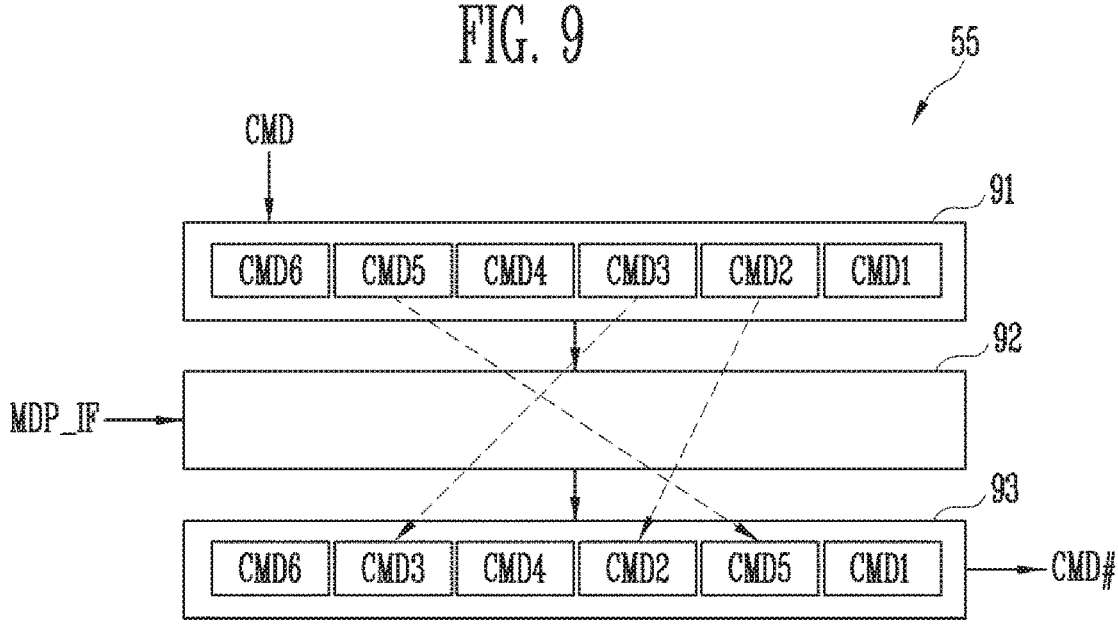
FIG. 9 is a detailed diagram of a command manager, such as that of FIG. 5.

FIG. 9 is a detailed diagram of the command manager 55 of FIG. 5.

Referring to FIG. 9, the command manager 55 may store the commands output from the CPU 200 and re-arrange an execution order of the commands according to the adjusted power information MDP_IF. For example, the command manager 55 may include an original command storage buffer 91, a command queue controller 92 and a adjusted command storage buffer 93.

The original command storage buffer 91 may temporarily store the order in which the commands output from the CPU 200 are received. For example, when the CPU 200 sequentially outputs first to sixth CMD1 to CMD6, the original command storage buffer 91 may store the first to sixth commands CMD1 to CMD6 according to the received order.

The command queue controller 92 may re-arrange the execution order of the first to sixth commands CMD1 to CMD6 stored in the original command storage buffer 91 according to the adjusted power information MDP_IF, may queue the re-arranged commands CMD1 to CMD6 in the adjusted command storage buffer 93 and may sequentially output the queued commands CMD # therefrom.

Figure 10:
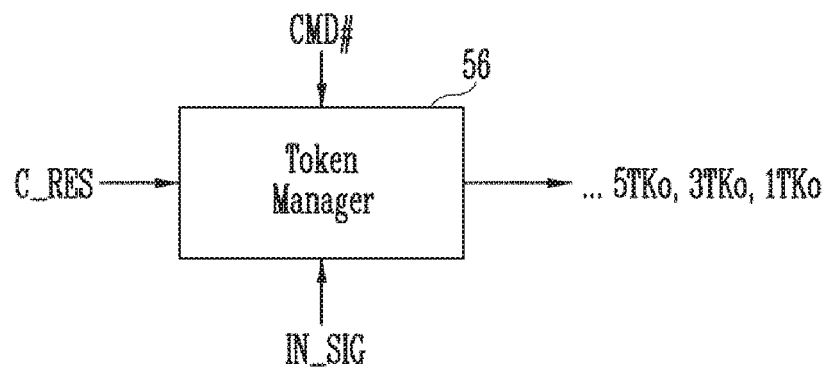
FIG. 10 is a detailed diagram of an operating method of a token manager, such as that of FIG. 5.

FIG. 10 is a detailed diagram of an operating method of the token manager 56 of FIG. 5.

The token manager 56 may receive the queued command CMD #, may check operating periods during which the peak power of the storage device 1100 is greater than the limit level in response to the calculation result C_RES output from the power manager 54 and the input signal IN_SIG output from the token counter 57, and may delay a corresponding operating period by outputting the first to kth token output signals 1TKo to kTKo before the corresponding operating period starts. For example, the token manager 56 may store the queued commands CMD # according to memory devices and determine at what time a peak power exceeds a limit level on the basis of the calculation result C_RES.

The token manager 56 may output the token output signals 1TKo to kTKo for delaying some operations of the memory devices causing peak power before the total of peak powers exceeds the limit level. For example, the token manager 56 may output the first token output signal 1TKo for delaying a period in which a peak power is consumed in the first memory device MD1 so that the total of the peak powers of the memory devices including the first memory device MD1 may not exceed the limit level.

For example, the token manager 56 may maintain disabled signals at high levels and enabled signals at low levels, among the first to kth token output signals 1TKo to kTKo. For example, the first token output signal 1TKo may be enabled and output to a low level, the second to kth token output signals 2TKo to kTKo may be disabled and output to a high level. Low and high signals, which represent enablement and disablement respectively, may be changed or set depending on the memory system 1000. That is, the reverse logic may be employed in which a low signal represents disablement or deactivation and a high signal represents enablement or activation. When the third and fifth token output signals 3TKo and 5TKo are enabled and output to a low level, the first, fourth, and sixth to kth token output signals 1TKo, 4TKo, and 6TKo to KTKo may be disabled to a high level.

The memory device receiving the enabled token output signals may delay a peak power period by temporarily stopping an internal clock.

In addition, the token manager 56 may count the number of times a delay operation is performed by the memory devices to which the first to kth token output signals 1TKo to kTKo are output, and may selectively output the first to kth token output signals 1TKo to kTKo on the basis of the count result. For example, the token manager 56 may selectively output the first to kth token output signals 1TKo to kTKo so that a delay operation may be performed first in a memory device having a lower count value than the other memory devices.

Figure 11:
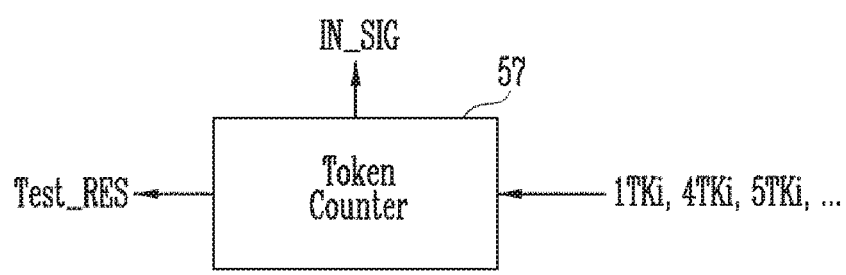
FIG. 11 is a detailed diagram of an operating method of a token counter, such as that of FIG. 5.

FIG. 11 is a detailed diagram of a method of operating the token counter 57 of FIG. 5.

The token counter 57 may output the test result value Test_RES or the input signal IN_SIG in response to the first to kth token input signals 1TKi to kTKi received from the first to kth memory devices MD1 to MDk, respectively. For example, the token counter 57 may output the test result value Test_RES to accurately define the peak power periods of the first to kth memory devices MD1 to MDk during a test operation of the memory system 1000. In other words, the token counter 57 may separate a test operation from an actual operation. The test result value Test_RES may be output during the test operation, and the input signal IN_SIG may be output during the actual operation.

During the test operation, the token counter 57 may receive the first to kth token input signals 1TKi to kTKi enabled only during peak power periods from the first to kth memory devices MD1 to MDk, respectively, and may output the test result value Test_RES including information about start and end times of enablement of the first to kth token input signals 1TKi to kTKi. The test result value Test_RES output by the token counter 57 may be used by the profile data storage 53 when adjusting the basic profile data.

During the actual operation, the token counter 57 may receive the first to kth token input signals 1TKi to kTKi enabled only during peak power periods from the first to kth memory devices MD1 to MDk, and may output the input signal IN_SIG including information about start and end times of enablement of each of the first to kth token input signals 1TKi to kTKi. For example, the token counter 57 may output the input signal IN_SIG with respect to an enabled token input signal, among the first to kth token input signals 1TKi to kTKi. For example, the token counter 57 may output the input signal IN_SIG with respect to the first token input signal 1TKi when the first token input signal 1Tki is enabled and received. When the fourth token input signal 4TKi is enabled and received after the first token input signal 1TKi, the token counter 57 may output the input signal IN_SIG with respect to the fourth token input signal 4TKi.

Figure 12:
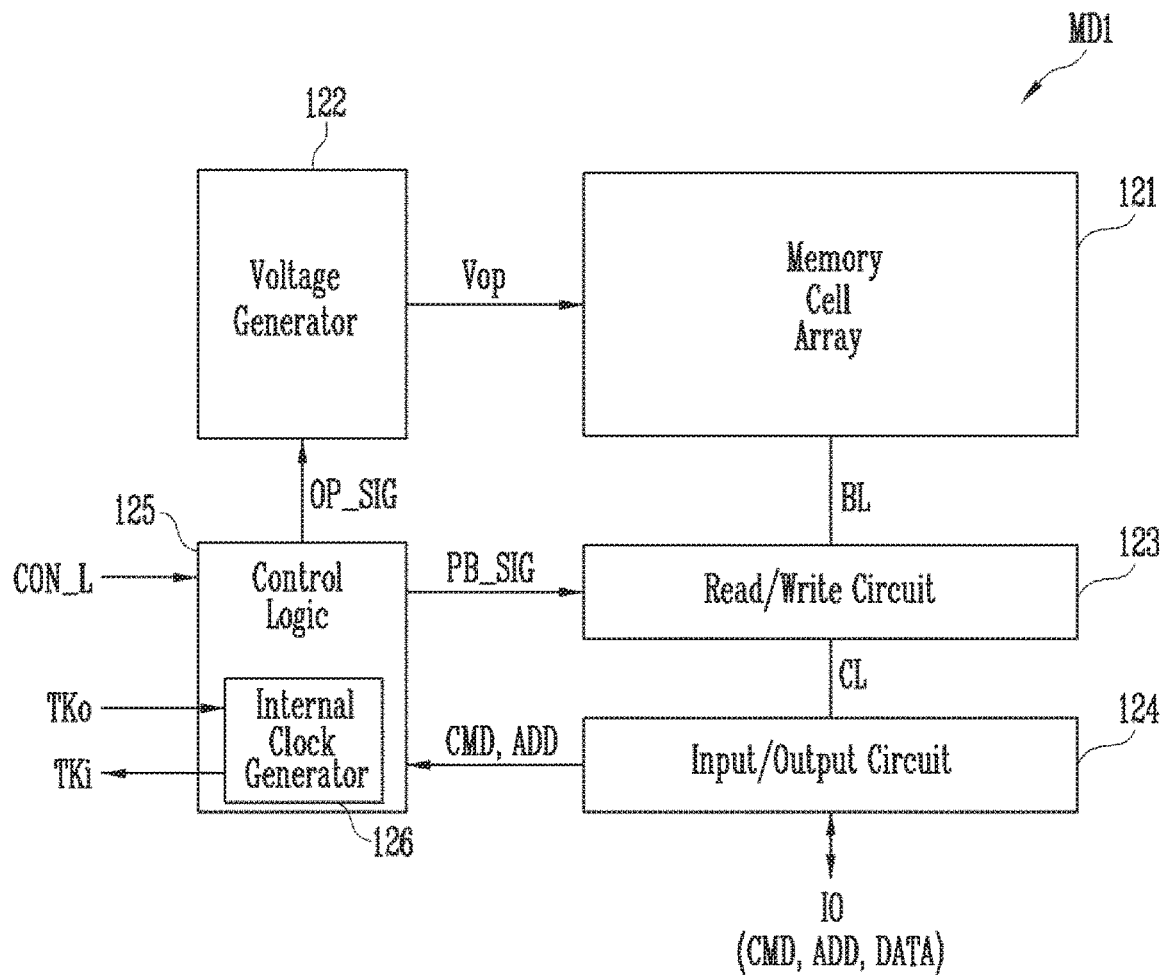
FIG. 12 is a detailed diagram of a memory device, such as that of FIG. 5.

FIG. 12 is a detailed diagram of a representative memory device among the memory devices MD1 to MDk of FIG. 5. The first memory device MD1, among the first to kth memory devices MD1 to MDk, is described below as an example.

Referring to FIG. 12, the first memory device MD1 may include a memory cell array 121, a voltage generator 122, a read/write circuit 123, an input/output circuit 124 and control logic 125.

The memory cell array 121 may include a plurality of memory blocks storing data, and each of the memory blocks may include a plurality of memory cells. Memory blocks may have a two-dimensional or three-dimensional structure according to the configuration of memory cells. For example, in a two-dimensionally structured memory block, memory cells may be arranged in a horizontal direction to a substrate. In a three-dimensionally structured memory block, memory cells may be stacked in a vertical direction to a substrate.

The voltage generator 122 may generate and output operating voltages Vop for a program, read or erase operation in response to operating signals OP_SIG. For example, during a program operation, the voltage generator 122 may output a program voltage, a pass voltage, a program verify voltage, and the like as the operating voltages Vop. During a read operation, the voltage generator 122 may output a read voltage, a pass voltage, and the like as the operating voltages Vop. During an erase operation, the voltage generator 122 may output an erase program voltage, a pass voltage, an erase verify voltage, and the like as the operating voltages Vop. The operating voltages Vop may be transferred to a selected memory block, among the memory blocks included in the memory cell array 121.

The read/write circuit 123 may be coupled to the memory cell array 121 through bit lines BL and to the input/output circuit 124 through column lines CL. The read/write circuit 123 may exchange data between the column lines CL or the bit lines BL in response to page control signals PB_SIG. For example, during a program operation, the read/write circuit 123 may apply a program permission voltage or a program inhibition voltage to the bit lines BL according to the data received through the column lines CL. During a read operation, the read/write circuit 123 may temporarily store data by sensing a voltage or current in the bit lines BL and may output the data through the column lines CL.

The input/output circuit 124 may transmit and receive the commands CMD, the addresses ADD and the data DATA through input/output lines IO. For example, the input/output circuit 124 may transfer the commands CMD and the addresses ADD, received from the controller 1200, to the control logic 125, and may transfer the data DATA to the read/write circuit 123. For example, the input/output circuit 124 may output the data DATA, received from the read/write circuit 123, to the controller 1200 through the input/output lines IO.

The control logic 125 may output the operating signals OP_SIG and the page control signals PB_SIG in response to the commands CMD and the addresses ADD. In addition, when a chip enable signal is applied through the control line CON_L, the control logic 125 may couple the first memory device MD1 to the controller 1200 through the input/output circuit 124.

In addition, the control logic 125 may include an internal clock generator 126 generating an internal clock for driving the first memory device MD1. For example, the internal clock generator 126 may generate an internal clock to control the voltage generator 122, the read/write circuit 123 and the input/output circuit 124. In other words, the voltage generator 122, the read/write circuit 123 and the input/output circuit 124 may operate only when the internal clock generator 126 generates an internal clock.

The internal clock generator 126 may stop generating an internal clock when a token output signal TKo is enabled or activated. When the token output signal TKo is disabled or deactivated, the internal clock generator 126 may re-generate an internal clock by enabling and outputting a token input signal TKi. The first memory device MD1 may not operate when the generation of the internal clock is stopped. In other words, subsequent operations of the first memory device MD1 may be delayed when the internal clock is not generated. When the internal clock is re-generated, the stopped operation may be resumed.

Figure 13:
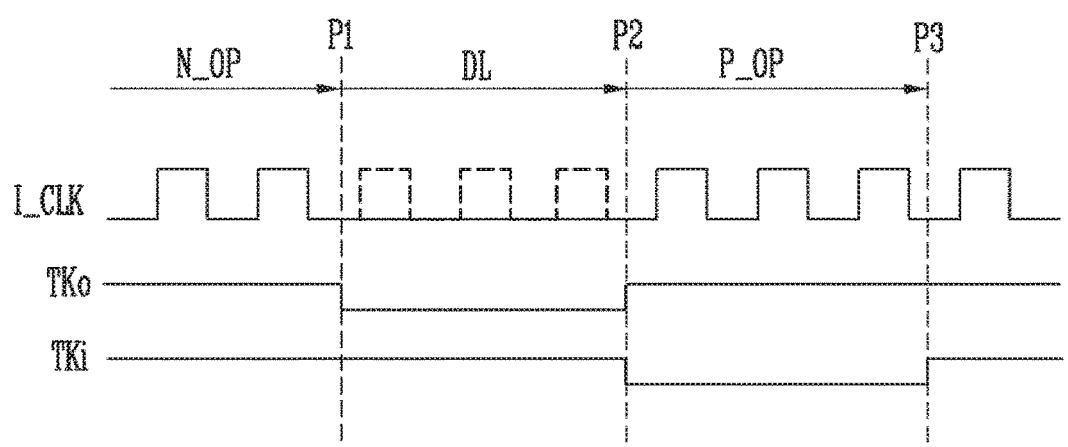
FIG. 13 is a detailed diagram of an operating method of an internal clock generator, such as that of FIG. 12.

FIG. 13 is a detailed diagram of an operating method of the internal clock generator 126 of FIG. 12.

Referring to FIG. 13, the internal clock generator 126 may generate an internal clock I_CLK when the token output signal TKo is deactivated to a high level (disabled), and may not generate the internal clock I_CLK when the token output signal TKo is activated to a low level (enabled). The internal clock generator 126 may generate the internal clock I_CLK again when the token output signal TKo is deactivated or disabled again to a high level. When the delayed operation is performed since the internal clock I_CLK is generated again, the internal clock generator 126 may enable the token input signal TKi to a low level and output the enabled token input signal TKi when the delayed operation is performed.

More specifically, in a normal operation period N_OP in which a peak power is not generated, both the token output signal TKo and the token input signal TKi may be disabled to a high level. Therefore, in the normal operation period N_OP, a normal operation may be performed by the internal clock I_CLK. When a peak power operation P_OP in which a peak power occurs after the normal operation period N_OP ends, the token output signal TKo may be enabled to a low level so that the entire peak power of the storage device 1100 may not exceed a limit level. While the token output signal TKo is enabled to a low level between time points P1 and P2, the peak power operation P_OP may be delayed since the internal clock I_CLK is not generated. A period in which the token output signal TKo is enabled to a low level between time points P1 and P2 may be a delay period DL. When the delay period DL ends at the time point P2, the token output signal TKo may be disabled, and the internal clock I_CLK may be re-generated to perform the peak power operation P_OP. The token input signal TKi may be enabled to a low level only while the peak power operation P_OP is performed between time points P2 and P3. Therefore, both the token output signal TKo and the token input signal TKi may be disabled after the time point P3 when the peak power operation P_OP finishes.

Figure 14:
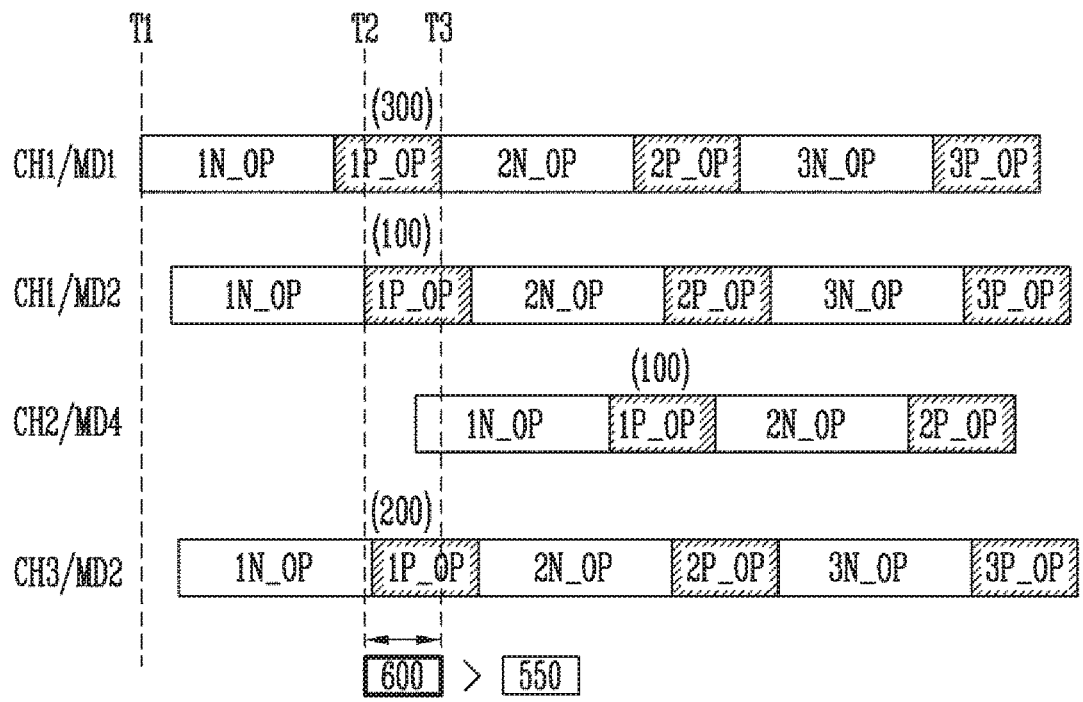
FIG. 14 is a diagram illustrating a case where limited peak power is exceeded.

FIG. 14 is a diagram illustrating a case where limited peak power is exceeded.

Referring to FIG. 14, when a plurality of memory devices are operated in response to the commands CMD queued by the command manager 55 as shown in FIG. 5, a time when each of the memory devices starts to perform an operation may vary depending on the entire peak power of the memory devices. However, since the peak power operation P_OP during which consumed power increases may vary depending on each operation, peak power periods of the memory devices may overlap each other in some periods (e.g., between times T2 and T3) and the total peak power may be greater than the limit level of the storage device 1100. The case where the storage device 1100 has a limit level of 550 will be described below as an example.

When the first and second memory devices MD1 and MD2 coupled to the first channel CH1, the fourth memory device MD4 coupled to the second channel CH2, and the second memory device MD2 coupled to the third channel CH3 operate in response to the commands, the memory devices may have different peak powers according to the commands. For example, an operation performed by the first memory device MD1 coupled to the first channel CH1 has a peak power of 300, an operation performed by the second memory device MD2 coupled to the first channel CH1 has a peak power of 100, an operation performed by the fourth memory device MD4 coupled to the second channel CH2 has a peak power of 100, and an operation performed by the second memory device MD2 coupled to the third channel CH3 has a peak power of 200. The first memory device MD1 coupled to the first channel CH1 may perform a first normal operation 1N_OP at a first time T1, and the remaining memory devices may perform first normal operations 1N_OP in response to received commands as indicated in FIG. 14. A normal operation performed by one memory device is not necessarily the same as that performed by another memory device. The same is true for a peak power operation. Power may be consumed during the first normal operations 1N_OP performed by different memory devices. However, since power consumption is not be high enough to affect the entire power management, a peak power may not be calculated when the first normal operations 1N_OP are performed.

When the different memory devices MD1, MD2, and MD4 perform first peak power operations 1P_OP with high power consumption at different times, a period between time points T2 and T3 in which the first peak power operations 1P_OP overlap each other may occur. In this overlapping period, since the peak powers of the respective memory devices add up, a sum of the peak powers of the first memory device MD1 (300), the second memory device (100), and the second memory device MD2 (200) may be 600, which exceeds the limit level of 550. As a result, errors may occur in operations of the memory devices, or reliability may be lowered. When periods in which the other peak power operations 2P_OP to 3P_OP performed after the first peak power operations 1P_OP overlap occur, the total peak power may be greater than the limit level.

Therefore, in accordance with embodiments of the present disclosure, one or more peak power operations may be delayed using a token output signal and a token input signal so that the total of the peak powers of the memory devices may not exceed the limit level. A detailed description of this aspect is given below with reference to FIG. 15.

Figure 15:
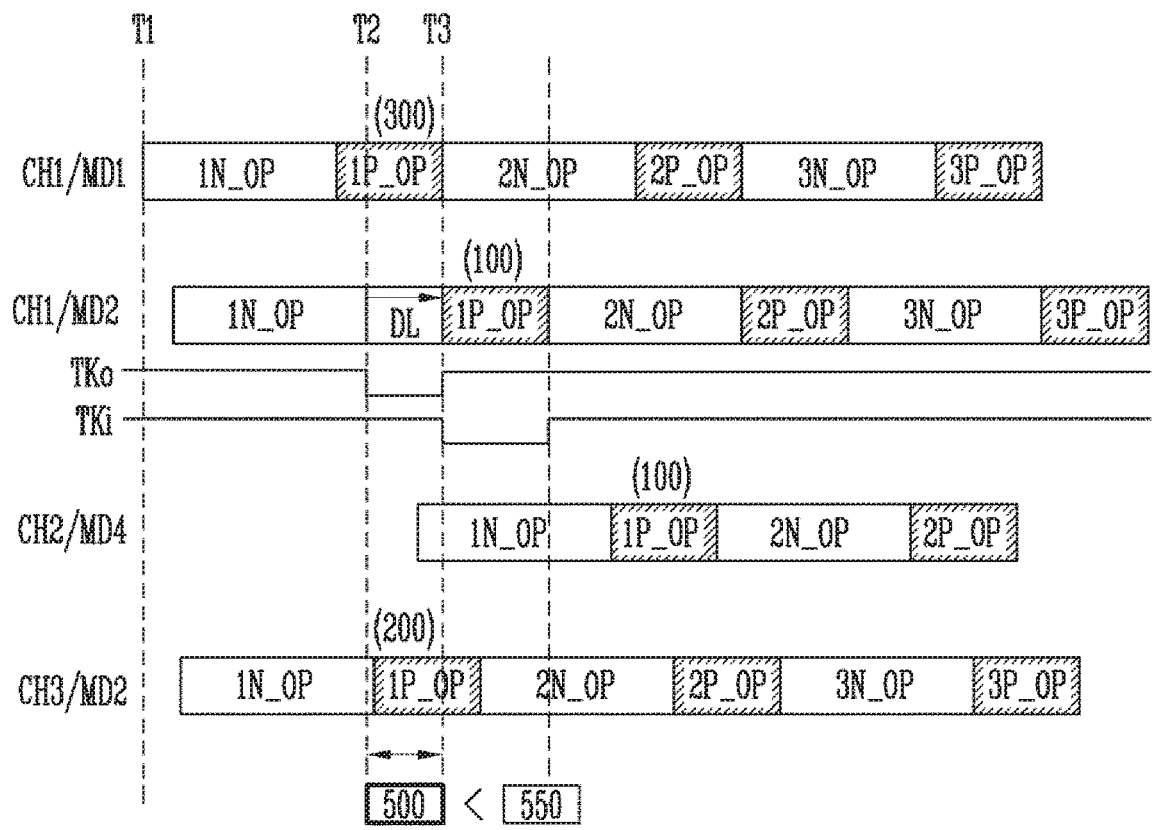
FIG. 15 is a diagram illustrating an operating method in accordance with an embodiment of the present disclosure.

FIG. 15 is a diagram illustrating an operating method in accordance with an embodiment of the present disclosure.

Referring to FIG. 15, when memory devices perform operations by executing commands as described above with reference to FIG. 14, the token output signal TKo and the token input signal TKi may be used so that some peak power operations may not overlap each other before the total of the peak powers of the memory devices exceeds the limit level.

More specifically, at a time T2, the first peak power operation 1P_OP of the second memory device MD2 coupled to the first channel CH1 may not be performed at the initially scheduled time; rather, that first peak power operation 1P_OP may be delayed using the token output signal TKo. For example, the flash interface layer 250 of FIG. 5 may determine at what time the peak power exceeds the limit level according to the commands output to the memory devices, and may enable and output the token output signal TKo to the second memory device MD2 coupled to the first channel CH1 at the time T2.

Since the second memory device MD2 coupled to the first channel CH1 does not generate an internal clock in response to the enabled token output signal TKo, the first peak power operation 1P_OP may be delayed (DL) during the period (T2 to T3). The total peak power may be 500 since the first peak power operation 1P_OP of the second memory device MD2 coupled to the first channel CH1 is not performed during the period (T2 to T3). In other words, the total peak power of the memory devices may be reduced to 500, which is less than the limit level of 550. Therefore, the total peak power may be controlled so as not to exceed the limit level by delaying a peak power operation of at least one memory device during a period in which the total peak power is expected to exceed the limit level. At a time T3 when the sum of peak power of the peak power operations performed at the same time is reduced to be less than the limit level, the token output signal TKo may be disabled, so that the first peak power operation 1P_OP of the second memory device MD2 coupled to the first channel CH1 may be performed. When the first peak power operation 1P_OP is completed, the second memory device MD2 coupled to the first channel CH1 may enable and output the token input signal TKi.

When a period in which the total peak power of the memory devices is expected to exceed the limit level occurs after the period T2 to T3, the flash interface layer 250 may also delay the peak power operation of some memory devices during the corresponding period.

Figure 16:
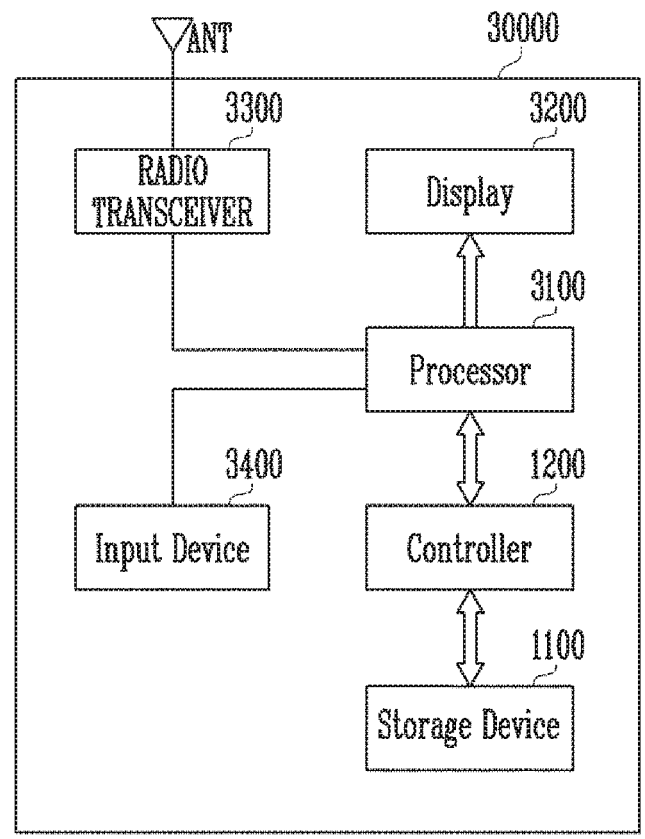
FIG. 16 is a diagram illustrating another embodiment of a memory system including a controller shown in FIG. 1.

FIG. 16 is a diagram illustrating another embodiment of a memory system 30000 including the controller 1200 shown in FIG. 1.

Referring to FIG. 16, the memory system 30000 may be embodied into a cellular phone, a smart phone, a tablet PC, a personal digital assistant (PDA), or a wireless communication device. The memory system 30000 may include a storage device 1100 and the controller 1200 controlling the operations of the storage device 1100. The controller 1200 may control a data access operation of the storage device 1100, for example, a program operation, an erase operation, or a read operation of the storage device 1100 in response to control of a processor 3100.

The controller 1200 may control data programmed into the storage device 1100 to be output through a display 3200.

A radio transceiver 3300 may exchange a radio signal through an antenna ANT. For example, the radio transceiver 3300 may convert the radio signal received through the antenna ANT into a signal which can be processed by the processor 3100. Therefore, the processor 3100 may process the signal output from the radio transceiver 3300 and transfer the processed signal to the controller 1200 or the display 3200. The controller 1200 may transfer the signal processed by the processor 3100 into the storage device 1100. In addition, the radio transceiver 3300 may convert a signal output from the process 3100 into a radio signal and output the radio signal to an external device through the antenna ANT. A control signal for controlling the operations of the processor 3100 or data to be processed by the processor 3100 may be input by the input device 3400, and the input device 3400 may include a pointing device, such as a touch pad and a computer mouse, a keypad, or a keyboard. The processor 3100 may control operations of the display 3200 so that the data output from the controller 1200, the data output from the wireless transceiver 3300, or the data output from the input device 3400 may be displayed on the display 3200.

In accordance with an embodiment, the controller 1200 for controlling the operations of the semiconductor device 1100 may be formed as a part of the processor 3100, or formed as a separate chip from the processor 3100.

Figure 17:
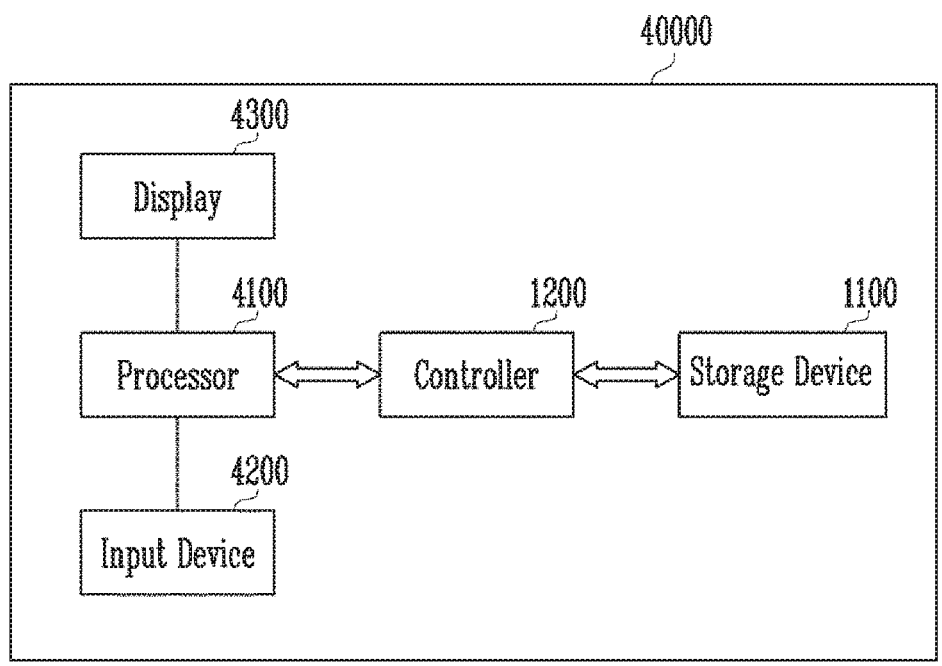
FIG. 17 is a diagram illustrating another embodiment of a memory system including a controller shown in FIG. 1.

FIG. 17 is a diagram illustrating another embodiment of a memory system 40000 including the controller 1200 shown in FIG. 1.

Referring to FIG. 17, the memory system 40000 may be embodied into a personal computer (PC), a tablet PC, a net-book, an e-reader, a personal digital assistant (PDA), a portable multimedia player (PMP), an MP3 player, or an MP4 player.

The memory system 40000 may include the storage device 1100 and the controller 1200 controlling the operations of the storage device 1100.

The processor 4100 may output data stored in the storage device 1100 through a display 4300 according to data input through an input device 4200. Examples of the input device 4200 include a pointing device such as a touch pad or a computer mouse, a keypad, or a keyboard.

The processor 4100 may control the general operations of the memory system 40000 and control the operations of the controller 1200. In accordance with an embodiment, the controller 1200 for controlling the operations of the storage device 1100 may be formed as a part of the processor 4100, or formed as a separate chip from the processor 4100.

Figure 18:
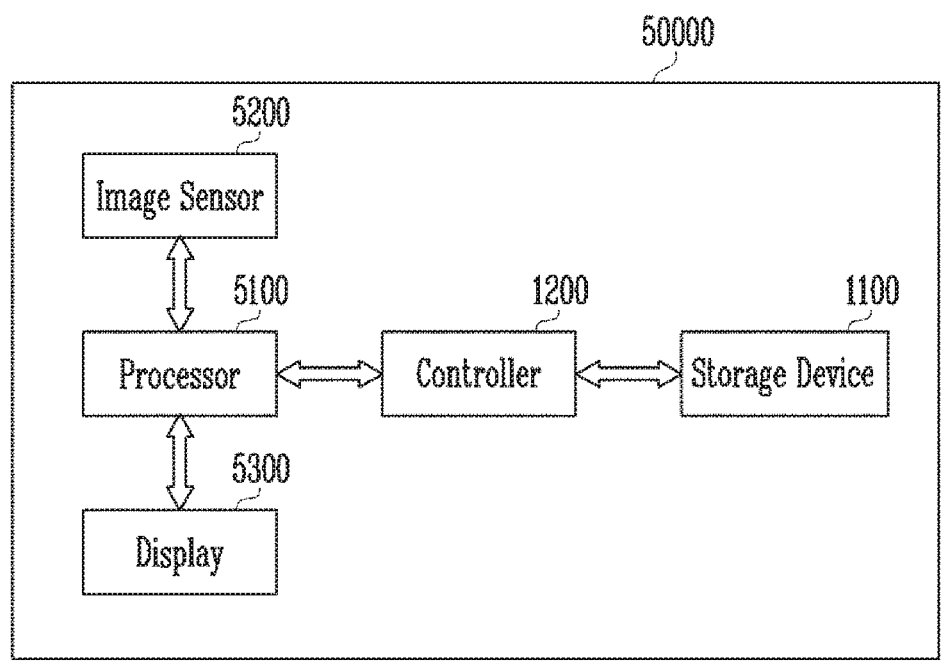
FIG. 18 is a diagram illustrating another embodiment of a memory system including a controller shown in FIG. 1.

FIG. 18 is a diagram illustrating another embodiment of the memory system 40000 including the controller 1200 shown in FIG. 1.

Referring to FIG. 18, a memory system 50000 may be provided as an image processing device, for example, a digital camera, a mobile phone attached with a digital camera, a smart phone attached with a digital camera, or a tablet PC attached with a digital camera.

The memory system 50000 may include the storage device 1100 and the controller 1200 controlling a data processing operation of the storage device 1100, for example, a program operation, an erase operation or a read operation.

An image sensor 5200 of the memory system 50000 may convert an optical image into digital signals, and the converted digital signals may be transferred to the processor 5100 or the controller 1200. In response to control of the processor 5100, the converted digital signals may be output through the display 5300 or stored in the storage device 1100 through the controller 1200. In addition, the data stored in the storage device 1100 may be output through the display 5300 according to control of the controller 1200.

In accordance with an embodiment, the controller 1200 for controlling the operations of the storage device 1100 may be formed as a part of the processor 5100, or a separate chip from the processor 5100.

Figure 19:
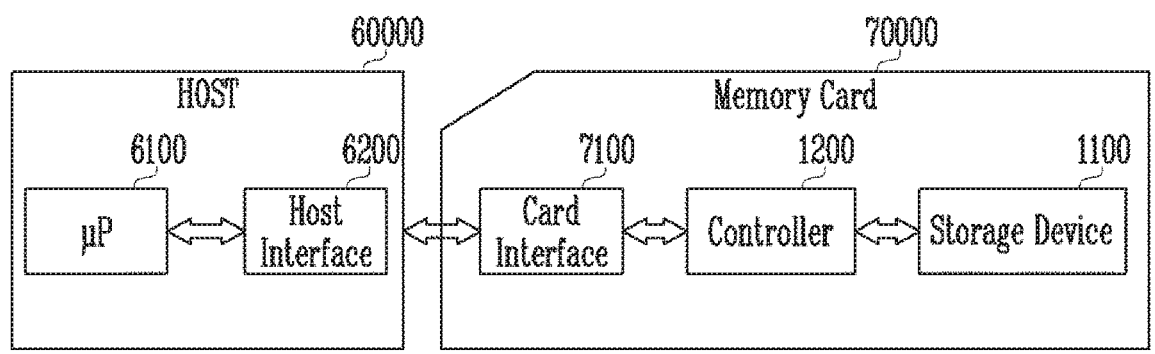
FIG. 19 is a diagram illustrating another embodiment of a memory system including a controller shown in FIG. 1.

FIG. 19 is a diagram illustrating another embodiment of the memory system 1000 including the controller 1200 shown in FIG. 1.

Referring to FIG. 19, a memory system 70000 may include a memory card or a smart card. The memory system 70000 may include the storage device 1100, the controller 1200 and a card interface 7100.

The controller 1200 may control data exchange between the storage device 1100 and the card interface 7100. In accordance with an embodiment, the card interface 7100 may be, but not limited thereto, a secure digital (SD) card interface or a multi-media card (MMC) interface.

The card interface 7100 may interface data exchange between a host 60000 and the controller 1200 according to a protocol of the host 60000. In accordance with an embodiment, the card interface 7100 may support a Universal Serial Bus (USB) protocol and an InterChip (IC)-USB protocol. The card interface 7100 may refer to hardware that supports a protocol used by the host 60000, software mounted on the hardware, or a signal transmission method.

When the memory system 70000 is connected to an host interface 6200 of the host 60000 such as a PC, a tablet, a digital camera, a digital audio player, a cellular phone, console video game hardware, or a digital set-top pox, the host interface 6200 may perform data communication with the storage device 1100 through the card interface 7100 and the memory controller 2100 in response to control of a microprocessor (pP) 6100.

In accordance with embodiments of the present disclosure, by considering power supplied to a memory system, an execution order of commands for operating memory devices may be controlled, and the memory devices may be controlled so that operations with larger power consumption, among operations of the memory devices, may not be performed at the same time in response to the commands. Accordingly, a memory system may be stably operated.

While various embodiments of the present disclosure have been disclosed, those skilled in the art will appreciate in light of the present disclosure that various modifications, additions and substitutions are possible. Thus, the present invention covers all such modifications, additions and substitutions provided they come within the scope of the appended claims and their equivalents.

What is claimed is:

1. A memory system, comprising:
a plurality of memory devices storing data;
a processor generating commands at a request of a host; and
a flash interface layer controlling execution timings of the commands based on a power consumption amount of each of the plurality of memory devices, counting a number of times a delay operation is performed on each of the plurality of memory devices, determining a target memory device having a lower count value than other memory devices based on a count result among the plurality of memory devices in response to that a total peak power of the plurality of memory devices is expected to exceed a limit level, and transferring signals for the delay operation to the target memory device,
wherein the power consumption amount is an amount of power consumed by each of the plurality of memory devices to perform an operation corresponding to the commands, and
wherein the delay operation is performed to delay execution or transfer of commands of one or more of the plurality of memory devices when the total peak power of the plurality of memory devices is expected to exceed the limit level.

2. The memory system of claim 1, wherein the flash interface layer comprises:
a power compensation circuit adjusting a power budget for the plurality of memory devices by measuring a total power consumption amount of the plurality of memory devices;
a profile data storage storing power consumption profile data of each of the plurality of memory devices;
a power management circuit adjusting power consumption amounts of the plurality of memory devices in real time and calculating a period in which the total peak power is greater than the limit level on the basis of adjusted power consumption amounts and the power consumption profile data;
a command management circuit changing an execution order of the commands on the basis of the adjusted power consumption amounts and outputting the commands according to a changed execution order;
a token management circuit calculating a peak power operation period of the plurality of memory devices in which the commands according to the changed execution order are executed, and transmitting a token output signal for selectively delaying commands corresponding to the peak power operation period, among the commands according to the changed execution order; and
a token count circuit receiving a token input signal during the peak power operation period and transmitting information for start and end times of the peak power operation period of the plurality of memory devices.

3. The memory system of claim 2, wherein the power compensation circuit comprises:
a power monitor circuit transmitting total current amount information by monitoring a current of a line through which power is supplied; and
a power budget compensation circuit transmitting a power compensation signal to adjust the power consumption profile data according to the total current amount information.

4. The memory system of claim 2, wherein the profile data storage stores basic profile data on each of the plurality of memory devices, and stores the power consumption profile data by adjusting the basic profile data according to current power states of the plurality of memory devices by the power compensation circuit.

5. The memory system of claim 2, wherein each of the plurality of memory devices delays execution or transfer of commands corresponding to the peak power operation when the token output signal is received.

6. The memory system of claim 5, wherein each of the plurality of memory devices delays execution or transfer of commands corresponding to the peak power operation by stopping generation of an internal clock when the token output signal is received.

7. The memory system of claim 6, wherein each of the plurality of memory devices executes the commands corresponding to the peak power operation by generating the internal clock when the token output signal is disabled.

8. The memory system of claim 7, wherein each of the plurality of memory devices outputs the token input signal when the commands corresponding to the peak power operation are executed.

9. The memory system of claim 8, wherein each of the plurality of memory devices disables the token input signal when execution of the commands corresponding to the peak power operation is completed.

10. A memory system, comprising:
a storage device storing data in a plurality of memory devices; and
a controller controlling the storage device in response to a request of a host,
wherein the controller monitors power consumed by the storage device, counts a number of times peak power operations for each of the plurality of memory devices are delayed, calculates a period in which a peak power of the storage device being operated exceeds a limit level based on the power, and delays a peak power operation of a target memory device having a lower count value than other memory devices based on a count result among the plurality of memory devices in response to the peak power exceeding the limit level, in the period in which the peak power exceeds the limit level.

11. The memory system of claim 10, wherein the storage device includes an internal clock generator generating an internal clock for an internal operation.

12. The memory system of claim 11, wherein the storage device delays the peak power operation by stopping the generating of the internal clock.

13. The memory system of claim 12, wherein the storage device calculates a time when the peak power is lower than the limit level and performs the peak power operation by generating the internal clock again when the time arrives.

14. A method of operating a memory system, the method comprising:
storing, in a controller, peak power period information on operations of memory devices;
monitoring power consumption amounts of the memory devices and;
counting a number of times a delay operation is performed on each of the memory devices;
determining a target memory device having a lower count value than other memory devices in response to peak powers of the memory devices being expected to exceed a limit level based on a count result;
operating the memory devices according to the power consumption amounts;
delaying a peak power operation of the target memory device based on the power consumption amounts, before the peak powers of the memory devices exceed the limit level according to the peak power period information; and
performing a peak power operation on the target memory device after the peak power operation of the target memory device is delayed by a specific period of time.

15. The method of claim 14, further comprising adjusting the peak power period information according to power consumption amounts of currently operating memory devices, among the memory devices, after the monitoring of the power consumption amounts of the memory devices.

16. The method of claim 14, wherein the monitoring of the power consumption amounts of the memory devices comprises measuring a current of a power supply line to which the memory devices are coupled and through which the power is supplied.

17. The method of claim 14, wherein the operating of the memory devices according to the power consumption amounts comprises queueing commands according to the power consumption amounts and sequentially outputting the queued commands.

18. The method of claim 14, wherein the delaying of the peak power operation of the target memory device, among the memory devices, comprises:
obtaining a total peak power by adding up peak powers of periods in which peak power operations overlap each other, among periods in which normal operations of the memory devices are performed and periods in which the peak power operations are performed, and
delaying the peak power operation of the target memory device during a period in which the total peak power exceeds the limit level.

19. The method of claim 18, wherein the peak power operation is delayed by temporarily delaying generation of an internal clock in the target memory device.

20. The method of claim 19, wherein the peak power operation is performed again by generating the internal clock of the target memory device again.

* * * * *